US010853823B1

(12) United States Patent
Aggarwal et al.

(10) Patent No.: US 10,853,823 B1
(45) Date of Patent: Dec. 1, 2020

(54) READERSHIP INFORMATION OF DIGITAL PUBLICATIONS FOR PUBLISHERS BASED ON EYE-TRACKING

(71) Applicant: ADOBE INC., San Jose, CA (US)

(72) Inventors: Shilpi Aggarwal, Delhi (IN); Sourabh Goel, New Delhi (IN); Shradha Budhiraja Verma, New Delhi (IN)

(73) Assignee: Adobe Inc., San Jose, CA (US)

( * ) Notice: Subject to any disclaimer, the term of this patent is extended or adjusted under 35 U.S.C. 154(b) by 704 days.

(21) Appl. No.: 14/751,021

(22) Filed: Jun. 25, 2015

(51) Int. Cl.
*G06Q 30/02* (2012.01)
*G06F 3/01* (2006.01)
*G06F 40/106* (2020.01)
*G06F 40/166* (2020.01)

(52) U.S. Cl.
CPC ......... *G06Q 30/0201* (2013.01); *G06F 3/013* (2013.01); *G06F 40/106* (2020.01); *G06F 40/166* (2020.01)

(58) Field of Classification Search
None
See application file for complete search history.

(56) References Cited

U.S. PATENT DOCUMENTS

| 7,429,108 | B2 | 9/2008 | Rosenberg | |
|---|---|---|---|---|
| 9,256,784 | B1* | 2/2016 | Taylor | G06K 9/00597 |
| 2005/0108092 | A1* | 5/2005 | Campbell | A61B 3/113 |
| | | | | 705/14.64 |
| 2010/0039618 | A1* | 2/2010 | De Lemos | A61B 5/163 |
| | | | | 351/209 |
| 2012/0001923 | A1* | 1/2012 | Weinzimmer | G06F 3/013 |
| | | | | 345/473 |
| 2012/0072270 | A1* | 3/2012 | Waylonis | G06Q 30/02 |
| | | | | 705/14.1 |
| 2012/0105486 | A1* | 5/2012 | Lankford | G06F 3/0481 |
| | | | | 345/661 |
| 2012/0290950 | A1* | 11/2012 | Rapaport | H04L 51/32 |
| | | | | 715/753 |
| 2013/0124309 | A1* | 5/2013 | Traasdahl | H04L 67/22 |
| | | | | 705/14.49 |
| 2013/0314555 | A1* | 11/2013 | Vartanian | G06F 17/30876 |
| | | | | 348/207.1 |
| 2014/0068408 | A1* | 3/2014 | Le Chevalier | G06F 40/169 |
| | | | | 715/234 |

(Continued)

*Primary Examiner* — Leland Marcus
(74) *Attorney, Agent, or Firm* — Shook, Hardy & Bacon, LLP

(57) ABSTRACT

In various embodiments, readership information is received from consumer devices. The readership information from each consumer device is received over one or more network communications and indicates one or more sections of a published document as being read on the consumer device. The readership information can be from eye-tracking data collected while the digital publication is viewed in a document reader on the consumer device. The readership information is stored in association with the published document. At least some of the stored readership information is sent to a publisher device and indicates a number of times one or more sections of the published document have been read on the consumer devices. The readership information is presented on the publisher device in context to indicate relative readership of the sections on the consumer devices.

20 Claims, 8 Drawing Sheets

(56) References Cited

U.S. PATENT DOCUMENTS

| | | | |
|---|---|---|---|
| 2014/0085196 A1* | 3/2014 | Zucker | G06Q 30/0241 345/156 |
| 2014/0188766 A1* | 7/2014 | Waldman | G06F 17/30994 705/400 |
| 2014/0234826 A1* | 8/2014 | Breznitz | G09B 7/00 434/362 |
| 2015/0007307 A1* | 1/2015 | Grimes | G09B 5/08 726/18 |
| 2015/0042777 A1* | 2/2015 | Taguchi | G06K 9/00604 348/78 |
| 2015/0082136 A1* | 3/2015 | Cameron | G11B 27/005 715/203 |
| 2015/0097938 A1 | 4/2015 | Tsou et al. | |
| 2015/0220253 A1* | 8/2015 | Landau | G06F 15/0291 715/204 |
| 2016/0147298 A1* | 5/2016 | Flawn | G06F 3/013 715/776 |

\* cited by examiner

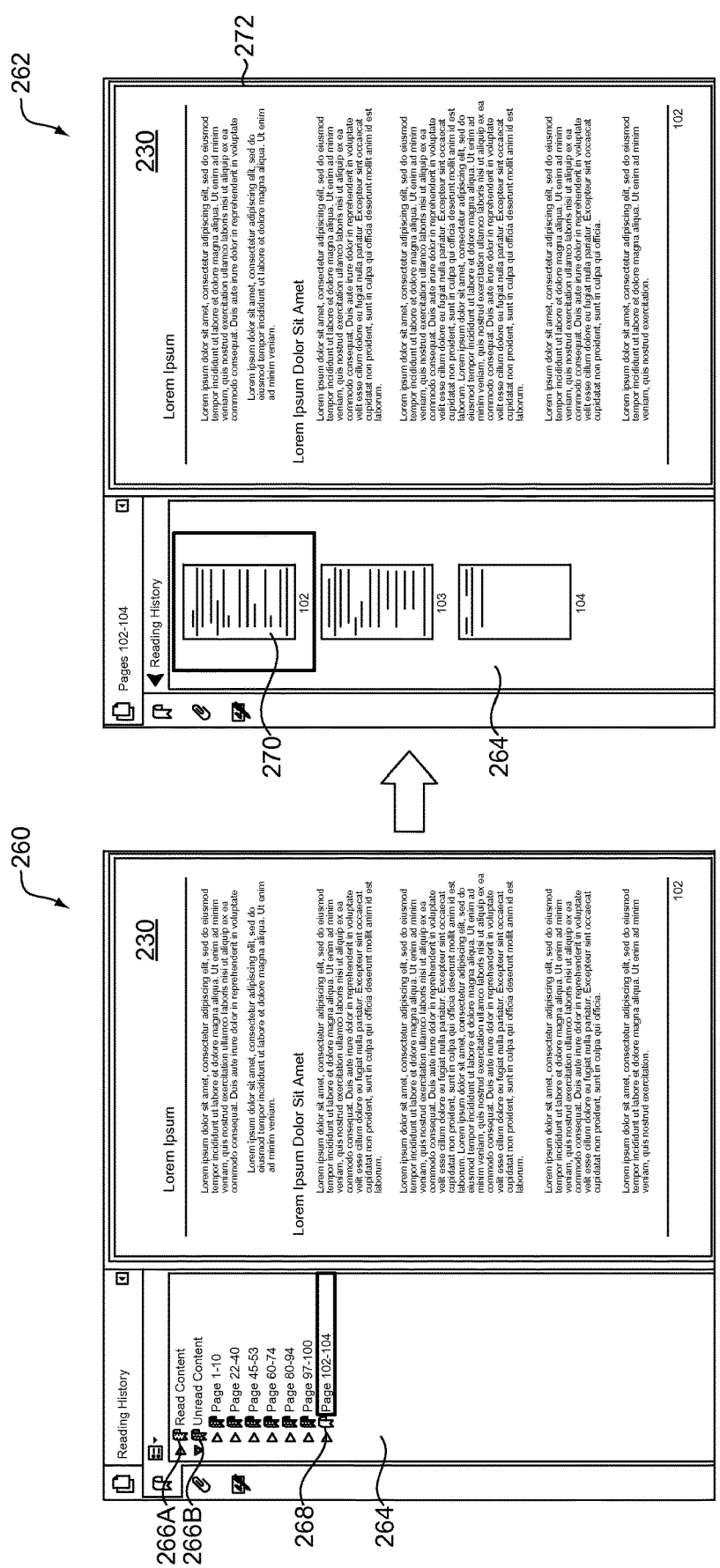

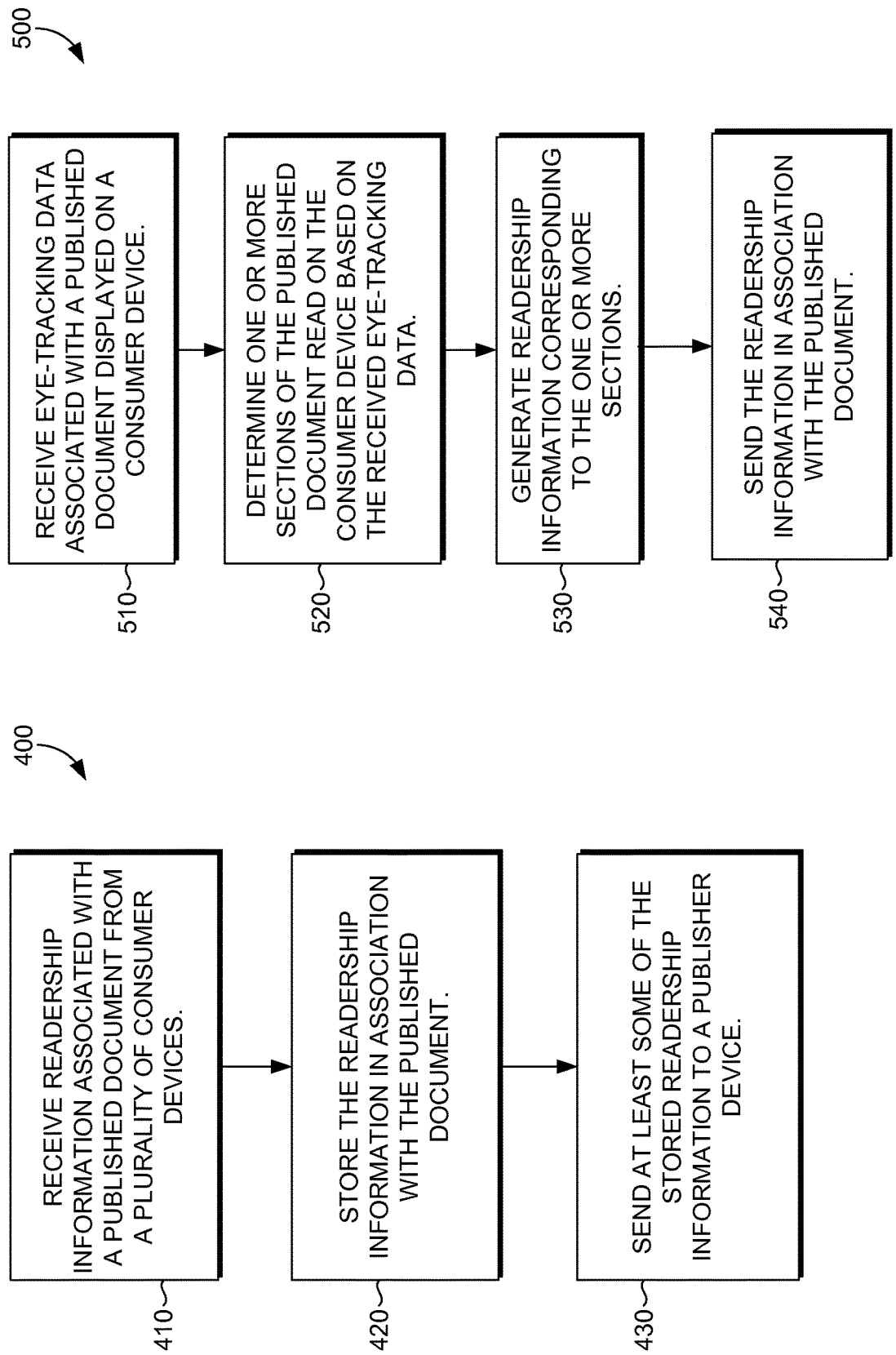

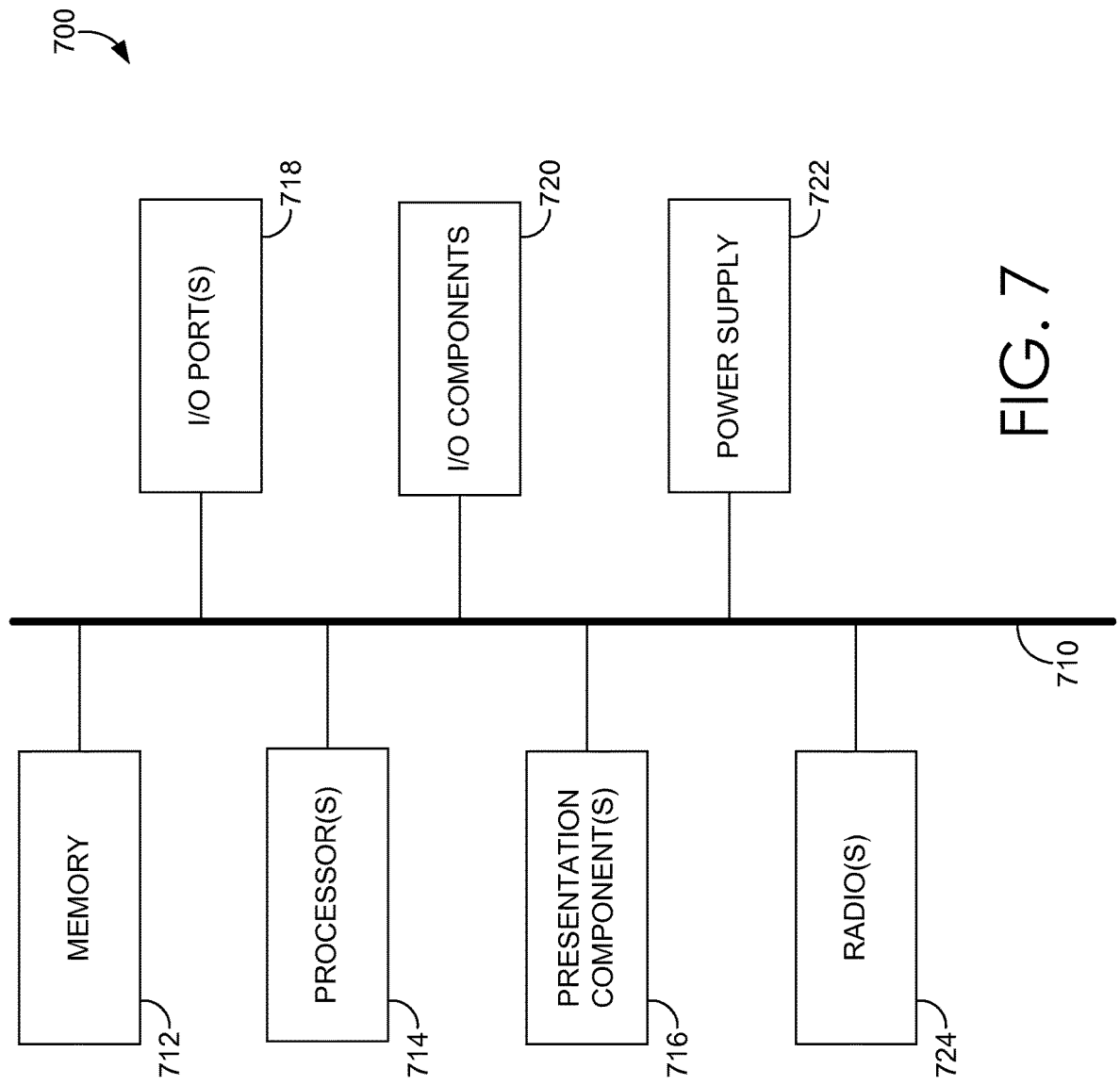

READERSHIP INFORMATION OF DIGITAL PUBLICATIONS FOR PUBLISHERS BASED ON EYE-TRACKING

BACKGROUND

The growing popularity of mobile devices, such as smart phones, tablet computers, e-readers, and the like, has coincided with a rise in the consumption of digital publications on those devices. For example, electronic books (e-books) and electronic magazines (e-magazines) that include electronic text (and possibly associated graphics and images) have become popular alternatives to their printed counterparts. Portable Document Format (PDF) has emerged as a leading format for publishing and distribution. A publisher may distribute a digital publication to consumers through a variety of online distribution mechanisms. Consumers can download the digital publications and read them using a document reader, such as Adobe® Acrobat® Reader.

Once distributed, it would be useful for a publisher to understand how and when its digital publication is being consumed. This information could be used to make decisions on what content to provide in future publications and how to provide that content. For example, a publisher may decide to replace or rework unpopular sections, features, articles, or authors, or allocate additional space for their more popular counterparts. Some readers may comment about a digital publication online in blogs, forums, and reviews. However, these comments often are not representative of what content is actually being read by users and what content largely goes unread. Furthermore, only a small percentage of readers of a publication typically comment about the publication online. Therefore, the information available to publishers to make informed decisions on content is imprecise and limited.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed toward providing readership information of published documents to publishers. In this regard, information that indicates whether, or to what extent, a published document, or portion (s) thereof, has been read by a consumer(s) is provided to a publisher. As described herein, readership information is generated using eye-tracking to monitor consumption of digital publications. Eye-tracking data is analyzed to determine which sections of digital content have been read on a consumer device and the readership information is generated to indicate, or identify, those sections. Thus, publishers can utilize the readership information from a plurality of consumer devices to understand the reading behavior of content by consumers.

In further respects, consumer devices provide readership information to cloud infrastructure that indicates which sections of published documents have been read on the consumer device. The cloud infrastructure stores the readership information and tracks the number of times sections of the published documents have been read. The cloud infrastructure can store the readership information for a published document based on configuration instructions from a publisher. The configuration instructions can be included in one or more requests and can comprise a copy of the published document, which the cloud infrastructure uses to generate a storage structure (e.g., one or more storage entries and/or files) for the readership information of the published document. The cloud infrastructure provides stored readership information for presentation on publisher devices. The readership information can be presented on publisher devices in context with the published document so that publishers can see differences in reading behavior between various sections of the published document.

BRIEF DESCRIPTION OF THE DRAWINGS

The present invention is described in detail below with reference to the attached drawing figures, wherein:

FIG. 2A illustrates exemplary presentation of readership information with a published document, in accordance with embodiments of the present disclosure;

FIG. 2B illustrates exemplary presentation of readership information with a published document, in accordance with embodiments of the present disclosure;

FIG. 4 is a flow diagram showing an exemplary method for providing readership information of published documents to publishers;

FIG. 5 is a flow diagram showing an exemplary method for providing readership information of published documents to publishers;

FIG. 7 illustrates an exemplary operating environment for implementing embodiments of the present invention.

DETAILED DESCRIPTION

Figure 1A:
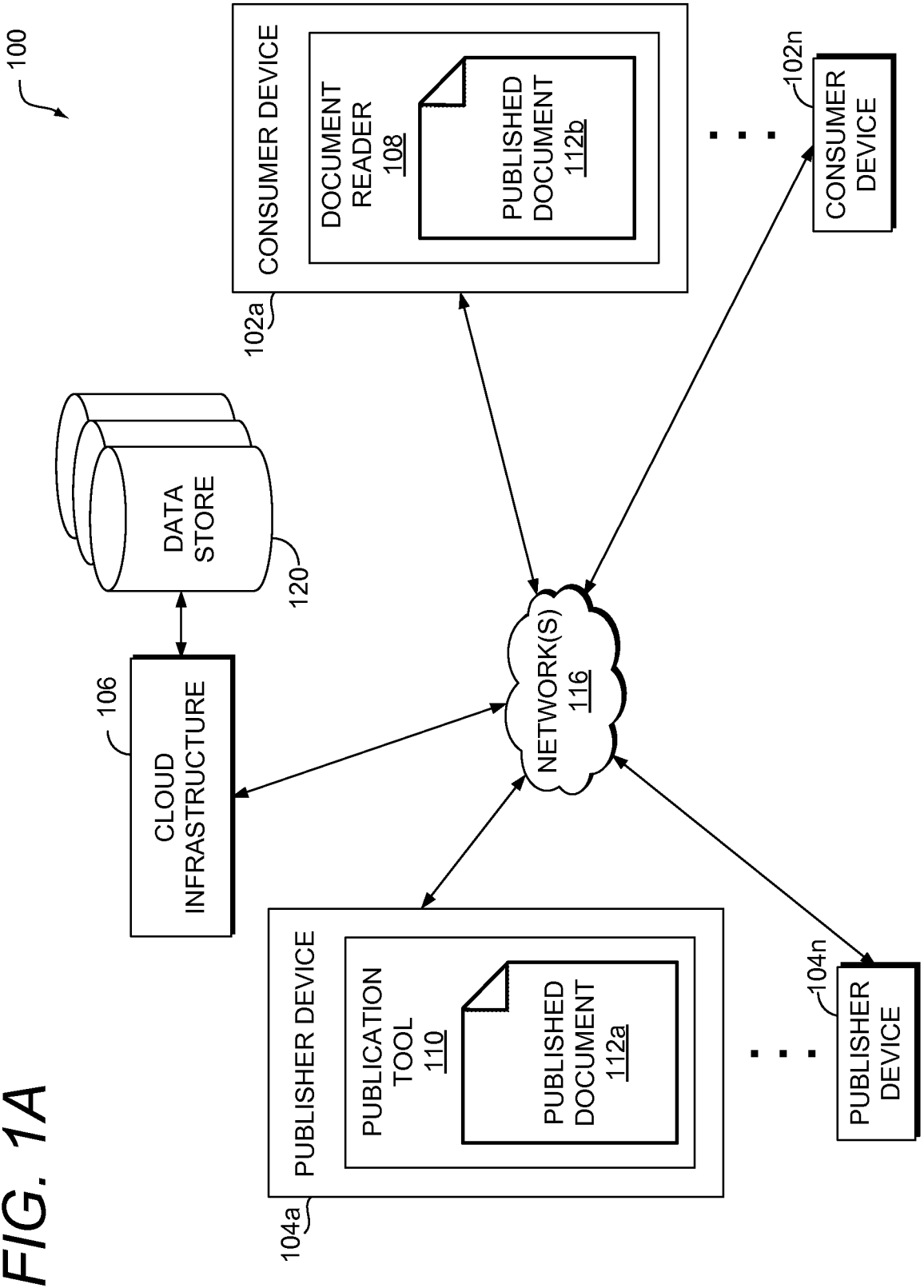
FIG. 1A is a diagram illustrating an exemplary system in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Once distributed, it would be useful for a publisher to understand how and when its digital publication is being consumed. This information could be used to make decisions on what content to provide in future publications and how to provide that content. For example, a publisher may decide to replace or rework unpopular sections, features, articles, or authors, or allocate additional space for their more popular counterparts. Some readers may comment about a digital publication online in blogs, forums, and reviews. However, these comments often are not representative of what content is actually being read by users and what content largely goes unread. Furthermore, only a small percentage of readers of a publication typically comment about the publication online. Therefore, the information available to publishers to make informed decisions on content is imprecise and limited.

In existing solutions, methods have been described for calculating reading time based on eye-tracking data. However, these methods merely presume content is being read when a user is gazing at the content. Therefore, the methods do not reliably indicate that the content has been read. Furthermore, these methods cannot distinguish between skimming or skipping over content and actual detailed reading of the content. Also, methods have been described for providing place-markers to indicate to a user where the user ceased reading content. However, these place-markers are temporary and only indicate an end point of reading as opposed to the extent of what was actually read. Additionally, none of these approaches relate to indicating readership information to publishers, which may be aggregated from many users.

Embodiments of the present invention are directed toward providing readership information of published documents to publishers. As further described below, the readership information is precise, reliable, and can be provided in sufficient quantity, such that publishers can make more informed decisions on content. The term "readership information" generally refers to information that indicates whether a published document, or portion(s) thereof, has been read by a consumer(s). A "consumer" generally refers to a person or persons that use a consumer device. In some respects, readership information is generated using eye-tracking to monitor consumption of digital publications.

Generally, eye-tracking data is analyzed to determine which sections of digital content have been read on a consumer device and readership information is generated to indicate, or identify, those sections. The term "eye-tracking data" refers to one or more measurements of eye positions and/or eye movements captured by one or more eye-tracking devices. By generating readership information from the eye-tracking data, the readership information can accurately capture actual reading behavior of consumers. Thus, publishers can utilize the readership information to understand the reading behavior of content by consumers. For example, the readership information can capture reading behavior specific to individual sections of content to provide a detailed understanding of the reading behavior.

In further respects, consumer devices provide readership information to a cloud infrastructure that indicates which sections of published documents have been read on the consumer device. The cloud infrastructure acts as a bridge between consumers and publishers to facilitate the collection and distribution of readership information. The cloud infrastructure may be used to keep the readership information secure, anonymous, and readily available when needed by publishers. Generally, the cloud infrastructure stores the readership information and tracks the number of times sections of the published documents have been read. The cloud infrastructure can store the readership information for a published document based on configuration instructions from a publisher. A "publisher" generally refers to a person or persons that uses a publisher device and may be associated with one or more publisher accounts used (e.g., maintained) by the cloud infrastructure. A publisher may be a person or entity that wrote, or authored, at least a portion of a digital publication, and/or a person or entity legally authorized to distribute the digital publication to consumers (e.g., a publishing company). The cloud infrastructure may require that a publisher log into one of the accounts to enable storage of and/or access to readership information for a published document.

Configuration instructions provided to the cloud infrastructure can include a copy of the published document, which the cloud infrastructure uses to generate a storage structure (e.g., one or more storage entries and/or files) for the readership information of the published document. The cloud infrastructure can provide stored readership information for presentation on publisher devices, for example, in context with the published document so that publishers can see differences in reading behavior between various sections of the published document.

Embodiments of the present disclosure advantageously allow for publishers to enable tracking of which sections of a published document have been read by consumers, and which sections go unread by aggregating readership information generated from eye-tracking data from consumer devices. Using this readership information, the publisher can understand how and when its digital publication is being consumed. Furthermore, by using eye-tracking to monitor consumption of digital publications, it can be indicated to the publisher that the sections were sufficiently read, as opposed to being skimmed, or largely skipped over by the consumers. The publishers need not manually identify and compile readership information from imprecise sources, such as blogs, forums, and reviews. Additionally, by portraying the readership information to a publisher with a published document, the publisher can readily distinguish more heavily read sections from less read sections in an intuitive manner.

Turning now to FIG. 1A, a diagram is provided illustrating an exemplary system in accordance with embodiments of the present disclosure. System 100 is a cloud-based system that can be utilized by publishers to monitor consumption of published documents. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes any number of consumer devices, such as consumer devices 102*a* through 102*n*, any number of publisher devices, such as publisher devices 104*a* through 104*n*, cloud infrastructure 106, and network 116. System 100 shown in FIG. 1A is an example of one suitable computing system architecture for implementing certain aspects of the present disclosure. Each of the consumer devices, publisher devices, and cloud infrastructure shown in FIG. 1A may be implemented as a single device or multiple devices cooperating in a distributed environment. Additionally, other components not shown may also be included within the distributed environment. Each device may correspond to computing device 700, later described with reference to FIG. 7, for example, and may communicate with each other via network 116.

Network 116 may be wired, wireless, or both. Network 116 may include multiple networks, or a network of networks, but is shown in simple form so as not to obscure aspects of the present disclosure. By way of example, network 116 can include one or more wide area networks (WANs), one or more local area networks (LANs), one or more public networks, such as the Internet, and/or one or more private networks. Where network 116 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 116 is not described in significant detail.

In various embodiments, consumer devices 102a through 102n and publisher devices 104a through 104n are computing devices that are capable of accessing the Internet, such as the World Wide Web. The devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Consumer devices 102a through 102n and publisher devices 104a through 104n can include one or more processors, and one or more computer-readable media. The computer-readable media may include computer-readable instructions executable by the one or more processors. The instructions may correspond to one or more applications, such as document reader 108 shown on consumer device 102a and publisher tool 110, shown on publisher device 104a.

Document reader 108 is an application a consumer, or user of consumer device 102a, can utilize to read a published document, such as published document 112b. In various embodiments, document reader 108 is operable to display published documents, such that a consumer may read one or more sections thereof. One specific example of document reader 108 is Adobe® Acrobat® Reader, which can be used to select, open, and read PDF documents. However, document reader 108 can generally correspond to any application that can display a published document to a consumer in a readable format. Thus, many types of document readers are suitable for various embodiments of the present disclosure.

Exemplary document readers include stand-alone applications that can be downloaded as a binary package and installed on a consumer device from an application store or marketplace, or other online repository. Other examples of document readers include cloud applications that are hosted, at least partially, on cloud infrastructure, such as cloud infrastructure 106, and accessible via consumer device 102a, for example through a web browser or other cloud interface application. Further examples of document readers include embedded applications, which are embedded into another application, such as a plug-in or extension to a web browser. As a further example, suitable document readers may be integrated into an operating system of consumer device 102a.

As described above, one suitable example of published document 112b is a PDF document. However, published document 112b can generally be in any format suitable for presenting textual content to a consumer. Examples of published document 112b include an e-literature document, an e-book, an e-magazine, an e-journal, a digital comic book, a digital novel, a digital newspaper, a digital novel, an electronic publication (ePub) document, an e-Reader document, a Broadband eBooks (BBeB) document, a compiled HTML document, a DjVu document, an iBook document, an AZW3 document, a fixed-format document, a fixed-layout flat document, and many more.

In some cases, published document 112b comprises text and formatting or layout information for the text, which can include one or more page breaks, fonts, and margins, which determine positions where characters of the text should be drawn. In addition, or instead, at least some text may be part of an image (e.g., a raster image), that is displayed to the consumer for reading.

Published document 112b can correspond to a copy of published document 112a, distributed to a consumer on consumer device 102a for reading. Although published documents 112a and 112b are depicted as separate copies or files, in some cases, a single copy may be shared between publishers and/or consumers. For example, the copy may reside in data store 120 and at least portions thereof can be provided to publisher tools and/or document readers on publisher and/or consumer devices.

Furthermore, although consumer device 102a is shown at a higher level of detail, any number of consumer devices, including consumer device 102n, of one or more other consumers, or users, can similarly include the same or a different document reader as consumer device 102a. Furthermore, any of those various consumers may read the same or a different copy of published document 112a using the document reader.

Publisher tool 110 is an application a publisher, or user of publisher device 104a, can utilize to publish a document, such as published document 112a. Publisher tool 110 is operable to perform, at least partially, any of various operations for preparing documents for publication. In some cases, publisher tool 110 is operable to create published document 112a, either directly, or from a base document (e.g., to convert the base document from a non-fixed-format document to a fixed-format document). In addition, or instead, publisher tool 110 may be operable to modify a document. In some cases, modification of a document includes operations for preparing the document for distribution, as will later be described in further detail. In some cases, publisher tool can also function as a document reader. For example, publisher tool 110 could be integrated into the same application as document reader 108, such as Adobe® Acrobat®.

Similar to document reader 108, document publisher tool can be part of a stand-alone application that can be downloaded as a binary package and installed on a consumer device from an application store or marketplace, or other online repository. Other examples of publisher tools include cloud applications that are hosted, at least partially, on cloud infrastructure, such as cloud infrastructure 106, and accessible via publisher device 104a, for example through a web browser or other cloud interface application. Further examples include embedded applications, which are embedded into another application, such as a plug-in or extension to a web browser. As a further example, publisher tools may be integrated into an operating system of publisher device 104a.

Although publisher device 104a is shown at a higher level of detail, any number of publisher devices, including publisher device 104n, of one or more other publishers, can similarly include the same or a different publisher tool than publisher device 104a. Furthermore, any of those various publishers may distribute respective published documents to consumer devices, such as consumer devices 102a through 102n. Thus, for example, consumer device 102a may store, or at least be capable of accessing published documents from a variety of potential publishers.

A publisher may distribute a digital publication, such as published document 112a to consumers through any combination of possible online distribution mechanisms including e-mail, an online bookstore, an online library, or an external drive, such as a flash drive. In some cases, cloud infrastructure 106 may be utilized to distribute digital publications. Consumers can access distributed digital publications and read them using a document reader, such as document reader 108. Publishers can utilize system 100 to understand how and when its digital publications are being consumed. This information can be used to make decisions on what content to provide and how to provide that content in future publications. In accordance with embodiments of the present disclosures, readership information of published documents are made available to publishers that can accurately capture what content is actually being read by consumers in published documents and what content largely goes unread. For example, readership information from each consumer device can indicate one or more sections of a published document that have been read by a consumer on the consumer device. Thus, publishers can make decisions on content with precise and accurate knowledge of consumer reading behavior.

In various embodiments, the readership information is collected from a plurality of consumer devices that are used by consumers to read published documents, for example, using document readers such as document reader 108. The readership information is provided, from the consumer devices, to cloud infrastructure, such as cloud infrastructure 106. The cloud infrastructure receives and stores the readership information from the various consumer devices. For example, cloud infrastructure 106 may store the readership information in data store 120 (at least one data store). Cloud infrastructure 106 can further make the readership information available to publishers on publisher devices, such as publisher device 104a.

A publisher can access the readership information of the consumers, for example, using an application, which may be the same or different than the publisher tool (e.g., publisher tool 110). As will later be described in further detail, in some cases, the publisher can utilize the application to view the readership information with the content of its corresponding published document. The readership information can be displayed to the publisher in-context, with corresponding content of the published document. Thus, the publisher can easily understand and interpret the readership information and make better decisions about their content.

Figure 1B:
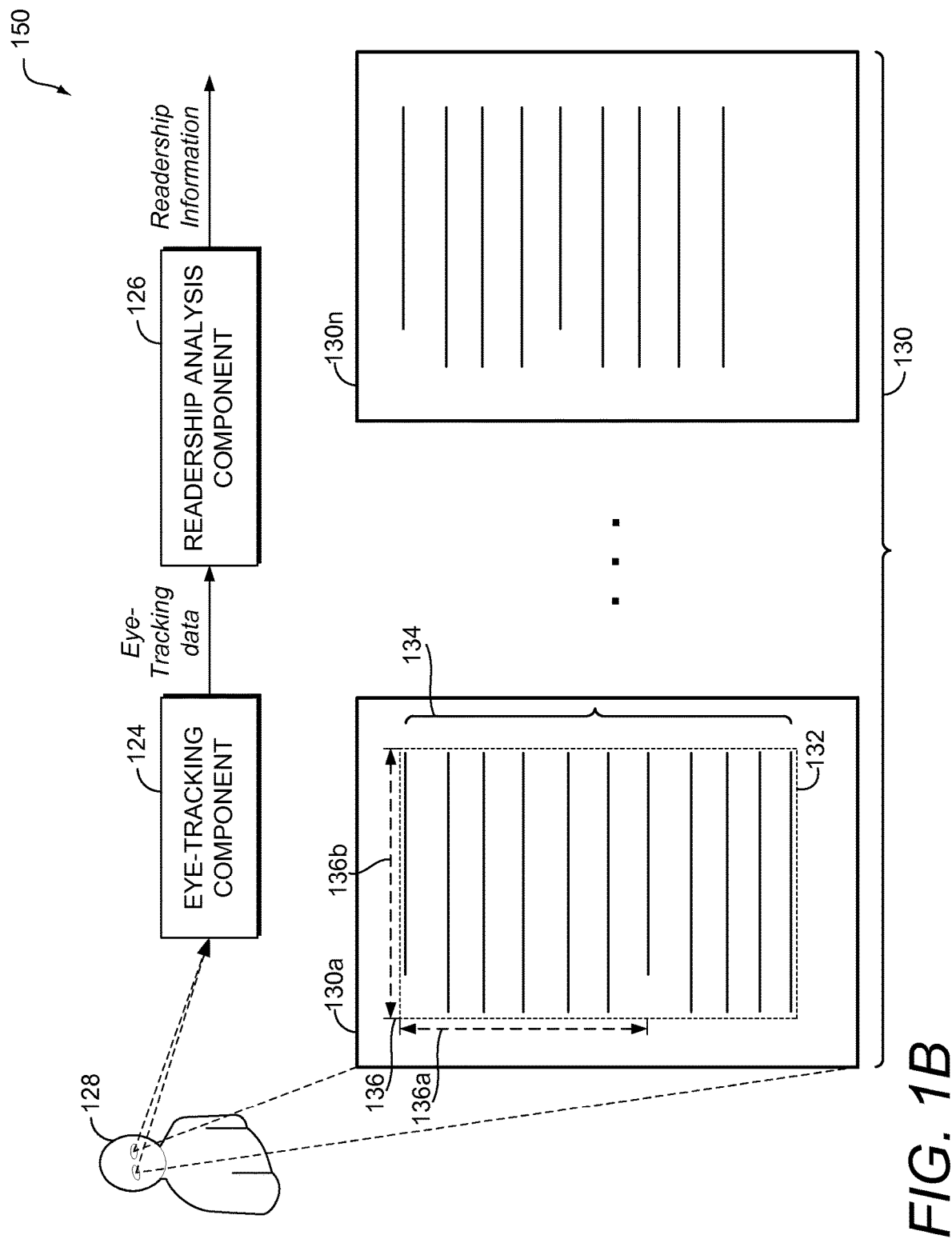
FIG. 1B is a diagram illustrating an exemplary environment, which can be employed for determining readership information of a published document, in accordance with embodiments of the present disclosure.

Referring now to FIG. 1B, a diagram is provided illustrating an exemplary environment 150, which can be employed by system 100 for determining readership information of a published document, in accordance with embodiments of the present disclosure. FIG. 1B shows eye-tracking component 124 and readership analysis component 126. Eye-tracking component 124 is configured to generate eye-tracking data using one or more eye-tracking devices, which is referred to in the singular for convenience only. The eye-tracking device is configured to provide input to eye-tracking component 124 that eye-tracking component 124 utilizes to measure eye positions and/or eye movement of a consumer, such as consumer 128. For example, eye-tracking component 124 may utilize the input to measure the point of gaze of the consumer (e.g., where a consumer is looking) and/or the motion of one or more eyes of the consumer relative to their head. In various embodiments, the eye-tracking device comprises one or more cameras and may be integrated into a consumer device, such as consumer device 102a being used by a consumer to read a digital publication. As an example, suitable cameras include front or rear mounted cameras on a consumer device, such as a smart phone or tablet computer. As another example, a suitable camera may be a webcam of a laptop computer.

As shown, eye-tracking component 124 provides the measured eye-tracking data to readership analysis component 126. Readership analysis component 126 is configured to analyze the eye-tracking data and generate readership information from the eye-tracking data. For example, readership analysis component 126 can analyze the eye-tracking data to determine whether the consumer has read a published document and/or one or more portions or sections thereof. Readership analysis component 126 may specify or otherwise indicate this information via the readership information. For example, in some cases, the readership information comprises an identifier for one or more portions or sections that it determines has been read by a consumer. The readership information can further include other information determined at least partially from the eye-tracking data, such as how long the user has been reading (e.g., in a reading session that may be defined by when the consumer opened and/or closed the published document in a document reader). As another example, the readership information may indicate how long the user has spent reading each of the portions or sections, or combinations thereof. As will later be described in further detail, in some cases, readership analysis component 126 is at least partially on the consumer device being used by a consumer to read the published document. However, readership analysis component 126 may at least partially be on cloud infrastructure 106.

Exemplary operation of eye-tracking component 124 and readership analysis component 126 will now be described. However, other approaches may be employed to generate readership information. By way of example, eye-tracking component 124 can be used by readership analysis component 126 to detect consumer 128 reading published document 130. As shown, published document 130 comprises multiple pages, including page 130a through 130n. In some cases, each aforementioned section, or portion, corresponds to a page, such as one of pages 130a through 130n. However, the sections, or portions, may be delineated in any suitable manner. As further examples, each section may correspond to a respective article, chapter, paragraph, and/or sentence in published document 130.

In some cases, readership analysis component 126 determines that a section has been read based at least partially on an amount of the section scanned, viewed, and/or read by the consumer. For example, readership analysis component 126 may determine whether the consumer has scanned, viewed, and/or read at least a predetermined amount of the section, such as 90 percent or more of the section. The amount may be quantified in various ways, such as in terms of numbers of lines, characters, words, or paragraphs, each of which may be based on the scan area of the consumer when determining how much has been scanned, viewed, and/or read. In some cases, the amount is quantified as the scan area formed by the scan path and fixation patterns of the consumer detected using eye-tracking component 124. For example, the scan area may be represented as at least one scan rectangle area. The total amount of the section may be quantified as the total area of the section. For example, the total amount may correspond to at least one bounding box (e.g., minimum bounding box around the text of the section). Readership analysis component 126 may determine whether the scan rectangle area(s) is at least a predetermined percentage/fraction of the bounding box(es) of the section.

To illustrate the foregoing, FIG. 1B shows bounding box 132 generated by readership analysis component 126 for page 130a based on text 134 (e.g., lines of text) and/or other content on page 130a and defined by that content (e.g., excluding margins and headers/footers). FIG. 1B also shows scan area 136 (e.g., a scan rectangle) having an area defined by length 136a and width 136b. Readership analysis component 126 may determine that page 130a has not been read by the consumer based on the area of scan area 136 being less than 90 percent of the area of bounding box 132. A similar analysis may be employed by looking at total areas where multiple bounding boxes are used for a section and/or multiple scan areas are identified within the section.

Furthermore, in some cases, readership analysis component 126 determines that a section has been read based at least partially on the time spent by the consumer scanning, viewing, and/or reading the section. The time spent can also be based on the scan path and fixation patterns of the consumer within the section that are detected using eye-tracking component 124 (e.g., the difference between a start time and end time of the scanning, viewing, and/or reading as determined by readership analysis component 126). The time spent can be determined from one or more time samples measured while receiving input from the eye-tracking device. Readership analysis component 126 can determine that a section has been read based on determining whether the time spent for that section exceeds a threshold value.

Readership analysis component 126 may calculate the threshold value from the text and/or other content of the section being analyzed. The threshold value may be calculated to represent a baseline reading time for the baseline consumer (various baselines can be employed such as the read speed/rate for the average consumer/person). For example, the threshold value may be determined by readership analysis component 126 identifying an amount of text that makes up the section and calculating how long a baseline reader would take to read that amount of text. In some cases, the amount of text is based on the amount of words in the section and/or the amount of lines in the section. Further, the read speed/rate for the baseline consumer/person can be factored in based on a predetermined fixation time per word. Suitable values for a fixation time per word range from approximately 200 milliseconds per word to approximately 250 milliseconds per word, as verified by scientific research. Readership analysis component 126 may determine whether the time spent by the consumer is at least a predetermined percentage/fraction of the baseline reader (e.g., 90 percent). By way of specific example, readership analysis component 126 may determine whether the time spent is greater than or equal to a fraction/percentage (e.g., 90 percent) of the fixation time per word multiplied by the average number of words in a line of the section multiplied by the number of lines in the section. Where such a condition is met, readership analysis component 126 may still consider that the section has been read by the consumer. In doing so, readership analysis component 126 can verify that the user was truly reading the section and not merely scanning or glossing over the content.

Thus, amongst the potential factors readership analysis component 126 may employ in determining readership information for a section of a published document, readership analysis component 126 can consider at least time spent by the consumer on the section, and the amount of the section scanned by the consumer in the section. Where the time spent and the amount are determined as sufficient (e.g., based on exceeding corresponding threshold values), and/or other conditions are met, readership analysis component 126 can indicate the section in the readership information. The readership information can provide a section indicator for any to all sections readership analysis component 126 determines was sufficiently read by the consumer. For example, each section may have a unique identifier with respect to other sections in the published document. In the present example, a page number is a suitable section indicator. Furthermore, consecutive sections can be indicated as being sufficiently read in readership information by readership analysis component 126 using ranges of sections. A range of sections may encompass each section within a pair of section identifiers (inclusive or exclusive) provided in the readership information. A section identifier can uniquely identify a section or sections of a published document from other sections of the published document. As a specific example, where readership analysis component 126 determines that pages 1, 2, 3, 4, 10, 11, 12, 90, and 100 have been read by the consumer, the readership information could comprise: "Read content: [[1, 4], [10, 12], [90], [100]]." It should be appreciated that readership information can include additional information or different information than described above, and generally provides an indication of what portion(s) of a published document readership analysis component 126 has determined the consumer has read. Other examples of readership information includes time spent for each section, time spent in a reading session, an amount of times a section has been read, dates of reading sessions and/or dates particular sections have been read, and many more.

Eye-tracking component 124 and readership analysis component 126 can each be incorporated into any combination of consumer devices or cloud infrastructure. For example, eye-tracking data could be communicated to cloud infrastructure 106 from consumer device 102a via one or more network communications. As another example, eye-tracking component 124 and readership analysis component 126 can each be incorporated into consumer device 102a and the readership information could be communicated to cloud infrastructure 106 from consumer device 102a via one or more network communications. Further it is noted that the readership information may further be analyzed and processed by cloud infrastructure 106. In some embodiments, readership analysis component 126 is incorporated into the document reader displaying the published document, such as document reader 108. In addition, or instead, eye-tracking component 124 can be incorporated into the document reader. However, in some cases, eye-tracking component 124 is at least partially incorporated into the operating system of the consumer device. The document reader can receive the eye-tracking data from the operating system via one or more application program interface (APIs).

Thus, each consumer device can include an eye-tracking component and/or a readership analysis component operable to provide readership information from a plurality of consumer devices and potentially from a plurality of different published documents. The readership information from each consumer device is provided to the cloud infrastructure using one or more network communications where it can be made accessible to the publisher and/or a third parties. The data to be sent to the cloud infrastructure can be stored locally on the consumer device at least until the data is sent to the cloud infrastructure (or upon acknowledgement of receipt). In some cases, the data is persisted on local storage of the consumer device. For example, the data can be stored in the same folder as the published document, can be embedded with the published document, and/or otherwise be stored in association with the local document. The data can optionally be updated and augmented with additional eye-tracking data and/or readership information over multiple reading sessions that may be defined by the consumer opening and closing the document reader and/or published document. Further, the data can be transmitted to the cloud infrastructure at any time, which may be triggered by a consumer action that corresponding to opening or closing the document reader and/or published document. In some cases, the data can be transmitted periodically, such as while the document is being read and/or while the document is open in the document reader. By persisting the data on the consumer device, the data can be preserved for later transmittal when network resources are unavailable to the consumer device for an initial transmittal. As described below with respect to FIG. 1C, the published document can facilitate the transmittal of the data.

Figure 1C:
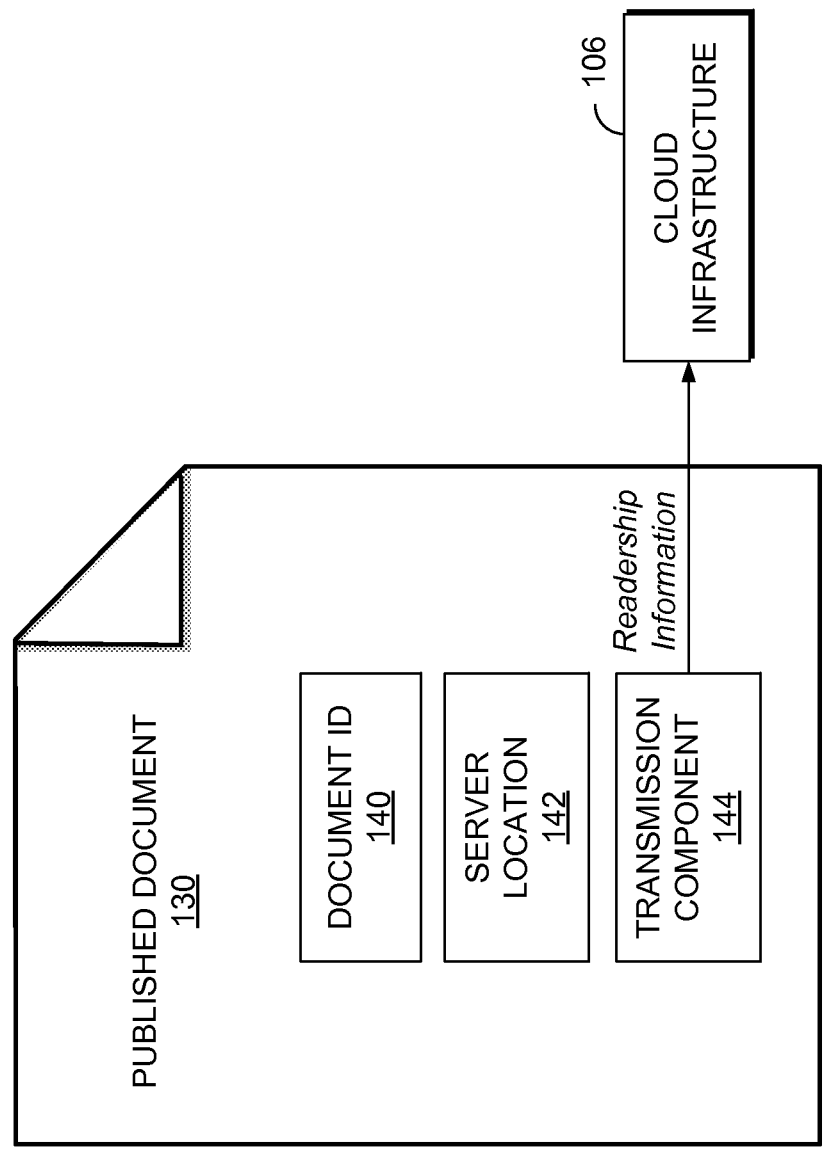
FIG. 1C is a diagram illustrating an exemplary published document, which can be employed by a system for determining readership information from a published document, in accordance with embodiments of the present disclosure.

Referring now to FIG. 1C, FIG. 1C a diagram is provided illustrating an exemplary published document 130, which can be employed by system 100 for determining readership information from a published document, in accordance with embodiments of the present disclosure. Published document 130 includes embedded data which facilitates the transmittal of data to cloud infrastructure 106 for tracking readership information of the published document. As shown, optional embedded information includes document identifier (ID) 140 and server location 142, which can be embedded in the metadata of published document 130. Document ID 140 is an identifier that cloud infrastructure 106 can utilize to identify the published document. Document ID 140 can uniquely identify the published document it is embedded within as opposed to the particular copy of the published document. In other words, each copy of the same published document may include document ID 140 across multiple consumer devices. In some embodiments, document ID 140 is transmitted to cloud infrastructure 106 in association with the data to indicate that the data corresponds to the published document (e.g., in the same or a different network communication). Although document ID 140 is embedded in the published documents in some embodiments, in others, it may be calculated or otherwise be derived on the consumer device.

Server location 142 indicates where the data should be transmitted to from the consumer device and could comprise a uniform resource identifier (URI) or other location information that may direct transmissions to a server of the cloud computing infrastructure. In particular, transmission component 144 can send the data to the location specified by server location 142 and may send document ID 140 in association with the data. Transmission component 144 comprises code that is operable/executable to transmit the data. In the embodiment shown, transmission component 144 is embedded in the published document. For example, transmission component 144 can comprise JavaScript code that may be executed upon document reader 108 opening published document 130. It will be appreciated that transmission component 144 can at least partially be incorporated into document reader 108, and further that server location 142 could be preconfigured or otherwise made available to transmission component 144 outside of the published document.

In some embodiments, the copy of the published document includes an indication that readership information is to be provided for the published document, whereas other published documents or copies thereof may not include such an indication. The readership information can be provided for the published document based on having the indication. In some cases, the indication is based on the presence of embedded information, such as any combination of the embedded information described above. In some embodiments, an explicit readership option identifier is embedded within the published document to provide such an indication.

Any portion of the information in published document 130 can be embedded therein by publisher tool 110 of FIG. 1A. In some cases, the publisher selects a tracking option in publisher tool 110 to track the readership information for the published document. Based on the option being selected, any combination of the information described above may be embedded in published document 130. In some embodiments, selection of an option causes published document 130 to be created with the embedded information. In other cases, selection of an option causes the information to be embedded into a pre-created published document 130 (e.g., the published may open a pre-created published document 130 in publisher tool 110 and subsequently select to embed the information). Thus, the publisher can distribute the published document 130 having the embedded information for tracking readership information. Other published documents or versions copies thereof could be distributed without the embedded information.

In some embodiments, for tracking readership information of a published document, the published document is uploaded to cloud infrastructure 106 from the published device (e.g., by the publisher tool). For example, published document 130 can be uploaded to cloud infrastructure 106 with or without the embedded information (the information could optionally be embedded at the cloud infrastructure). The uploading may be over one or more network communications and based on selection of the tracking option by the publisher. Based on receiving published document 130, cloud infrastructure 106 may generate an Extensible Markup Language (XML) file for storing readership information (e.g., received from consumer devices) in association with the published document. Each published document having readership information tracked may have a corresponding XML file on cloud infrastructure 106, as one specific example. The readership information can be aggregated and combined for storage by cloud infrastructure 106. Cloud infrastructure 106 can further generate document ID 140 or extract document ID 140 from the received published document and store the document ID in association with the published document. Upon receiving readership information from a consumer device, cloud infrastructure 106 stores the readership information in association with the published document that matches the document ID provided by the consumer device.

Thus, in accordance with various embodiments, readership information can be collected from a plurality of consumer devices and stored on cloud infrastructure in association with a published document. In further respects, the readership information can be made assessable to the publisher. For example, the readership can be provided from the XML file or other storage mechanism. In some cases, the publisher accesses the readership information through a web portal using a web browser or other application. For example, the publisher may log into a publisher account through the web portal to render the readership information assessable. In various embodiments, the readership information for a published document can be accessed by the publisher opening the published document (e.g., published document 130) in publisher tool 110 and/or a document reader. For example, the publisher may select a published document file and thereby open the published document for viewing. Where readership information is available for the published document on cloud infrastructure 106, the readership information can be transmitted to the publisher device. For example, the XML file or other storage file (or more generally the stored readership information) may be transmitted to the publisher device over one or more network communication. The received readership information can optionally be persisted to local storage on the publisher device and made available for offline access of the readership information.

In some embodiments, readership information generated from one or more consumers is visually conveyed to the publisher in association with corresponding text or other content in the published document. For example, publisher tool 110 may indicate one or more of the sections that correspond to the readership information. Readership information for a section may be presented to the publisher based on the number of times the section has been read by consumers, as indicated by the readership information. For example, the presentation can indicate the number of times the section has been read by consumers to the publisher. Indications for each section could be relative to indications for other sections. Thus, the readership information can be presented to convey which sections were heavily read by consumers and which sections were less read or unread by consumers, or other relative information between sections of content.

In some cases a visual indicator, such as numbers or images can be presented in association with each section to convey this information to the publisher. The visual indicators could be color coded to represent the relative nature of the information, such as in the examples shown in FIGS. 2A, 2B, and 3.

Referring now to FIGS. 2A and 2B, diagrams are provided illustrating exemplary display of readership information in association with published document 230, in accordance with embodiments of the present disclosure. The display may be provided via publisher tool 110 on publisher device 104a and published document 230 can correspond to published document 130 or another published document that has readership information available for display.

As shown in screen 260 of FIG. 2A, content of published document 230 is displayed to the publisher. Further displayed with the content of published document 230 are indicators generated by publisher tool 110 based on the readership information. This information is displayed in pane 264, by way of example. As shown, publisher tool 110 has categorized the sections of published document 230 based on the respective readership information of those sections. In particular, screen 260 displays categories 266a and 266b which publisher tool 110 has assigned sections based on the readership information for those sections. In particular, the assignments are based on the relative number of times consumers have read those sections, as indicated by the readership information. In the particular example, category 266a corresponds to content an instance of readership analysis component 126 determined had been sufficiently read by a consumer and category 266b corresponds to content that no instance of readership analysis component 126 determined had been sufficiently read by a consumer. However, it will be appreciated that categories may be further delineated, for example, by ranges of numbers of times sections have been read (e.g., highly read, moderately read, less read, etc.).

Each category can be displayed in association with one or more links to one or more sections that are assigned to that category. For example, seven links are shown in association with category 266b, of which link 268 is individually labeled. However, the category itself (e.g., category 226b) may be displayed as a link and operate similar to the other links. Each link corresponds to one or more sections of published document 130. For example, each link displays and corresponds to a range of sections. Although links are not shown for category 266a, those links may be revealed by selecting category 266a. Further, the ranges of sections for those links may fill in the gaps in the ranges of category 266b (e.g., Page 11-21, Page 41-44, etc.), such that each section may be represented by an associated category.

In some embodiments, selecting a link causes publisher tool 110 to display content corresponding to at least one of the sections represented by the link. For example, in FIG. 2A, the publisher has selected link 268. As a result, screen 260 can transition to screen 262 of FIG. 2A. Screen 262 displays representations of sections corresponding to the link, of which representation 270 is individually labeled. Each representation can act as a link that is selectable to display at least a portion of the section in main window 272. Further each representation may be generated from the content of a corresponding section to depict the content in miniaturized form.

With further respect to FIGS. 2A and 2B, categories and links are color coded to visually convey to the publisher the relative nature of the readership information for the various sections. Category 266a and/or its associated links can be colored green to indicate those sections have been read and category 266b and/or its associated links can be colored red to indicate those sections are unread. Where additional categories are employed those categories and/or associated links thereof can have a respective color as well, which may fall between colors assigned to a most highly read category and a least read category on a spectrum (e.g., between green and red).

In the approach illustrated by FIGS. 2A and 2B, sections are grouped into categories based on respective readership information to indicate the relative nature of the readership information to the publisher. In addition, or instead, the relative nature of the readership information to the publisher can be conveyed with respect to individual sections, an example of which is shown in FIG. 3.

Figure 3:
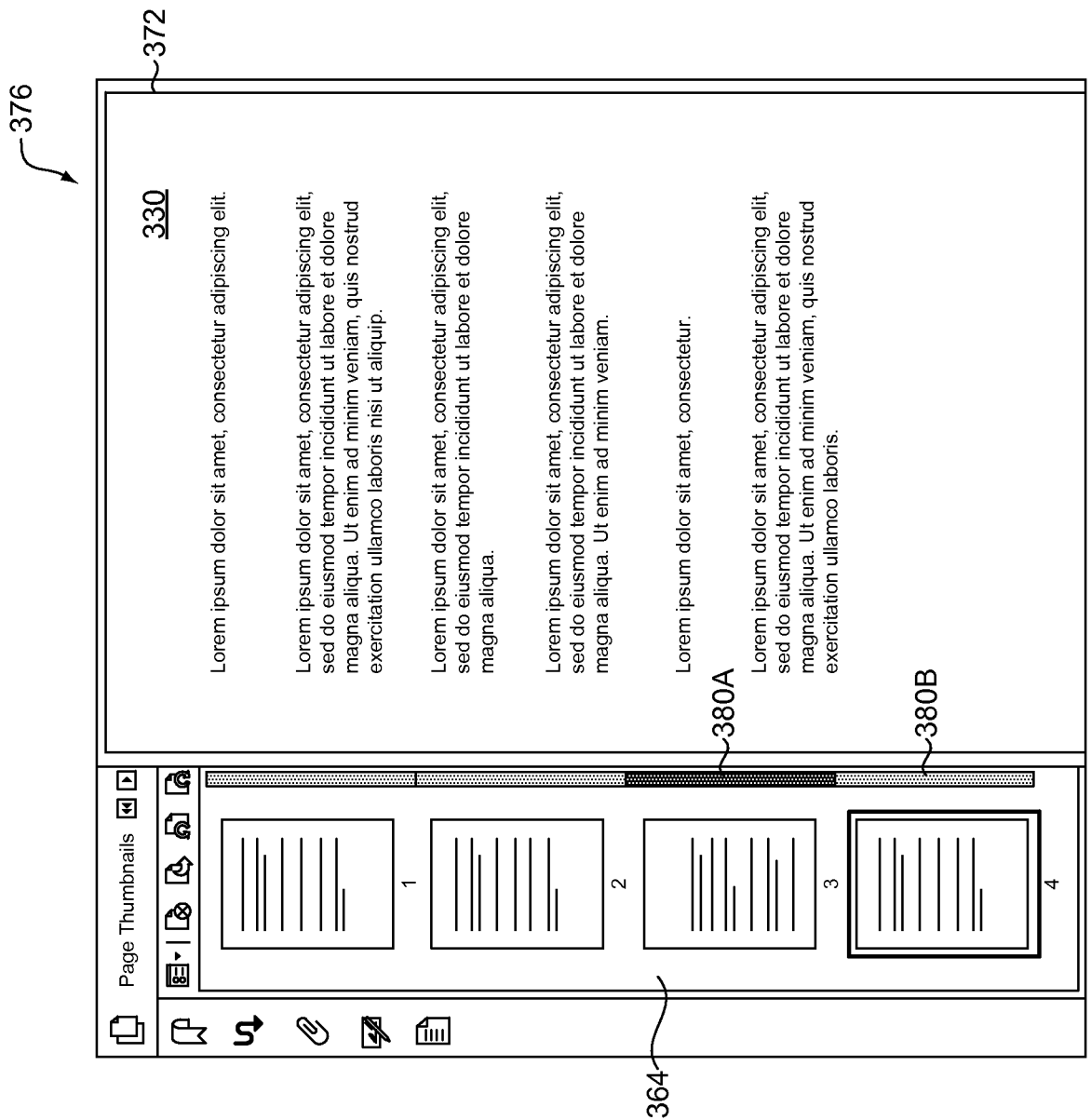
FIG. 3 illustrates exemplary presentation of readership information with a published document, in accordance with embodiments of the present disclosure.

FIG. 3 provides a diagram illustrating exemplary display of readership information in association with published document 330, in accordance with embodiments of the present disclosure. The display may be provided via publisher tool 110 on publisher device 104a and published document 330 can correspond to published document 230 or another published document that has readership information available for display. FIG. 3 shows main window 372 and pane 364 which can correspond respectively to main window 272 and pane 264 in FIGS. 2A and 2B. As shown, indicators are provided in association with respective sections of content of published document 330. For example, indicator 380a is displayed in association with a representation of a section corresponding to page 3 and indicator 380b is displayed in association with a representation of a section corresponding to page 4. The indicators indicate relative information between sections provided by the readership information, such as the relative readership between those sections. For example, indicator 380a may correspond to unread content and indicator 380b may correspond to read content. It will be appreciated the indicators may still correspond to categories, as described above can similarly have respective colors that convey the relative information (even where categories are not employed). For example, indicator 380a may be red and indicator 380b may be green. Various colors may be used to represent different amounts (and/or ranges) of readership for different sections.

Thus, the publisher can view the readership information for a published document, optionally in context with the published document and/or corresponding sections thereof. It will be appreciated that the readership information can be updated over time as additional consumers view the published document. Thus, the various categories, links, and other indicators that are displayed to the publisher can be different depending upon when the publisher is accessing the readership information on the cloud infrastructure.

Having described various aspects of the present disclosure, exemplary methods are described below for providing readership information of published documents to publishers. Referring to FIG. 4, a flow diagram showing method 400 is shown. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, method 400 comprises receiving readership information associated with a published document from a plurality of consumer devices. The readership information from each consumer device can be received over one or more network communications and can identify one or more sections of a published document as being read by a consumer on the consumer device. For example, cloud infrastructure 106 can receive readership information of published document 130 from any of consumer devices 102a through 102n over network 116. A copy of published document 130 may be located on each consumer device and may be viewed by the consumers using a respective instance or version of document reader 108. The readership information can be received from each consumer device from a respective instance or version of readership analysis component 126 on the consumer device. As another example, readership analysis component 126 may be located on cloud infrastructure 106 and process eye-tracking data provided from each consumer device. In either example, the data can be provided to cloud infrastructure via a respective instance of transmission component 144, which is optionally embedded in published document 130.

As an example, the readership information from consumer device 102a can identify multiple pages and/or page ranges of sections read on consumer device 102a. More particularly, the readership information can specify that the consumer read pages 1 through 4, 10 through 12, 90, and 100 of published document 130.

At block 420, method 400 includes storing the readership information in association with the published document. Continuing with the present examples, cloud infrastructure 106 can store the readership information in an XML file created for published document 130 in data store 120. The XML file may be identified and used for storage of the readership information based on document ID 140 being provided in association with the received readership information. The stored readership information from various consumer devices can be aggregated and/or combined for storage in the XML file. As an example, the XML file may include entries for pages, and each entry may indicate how many times its corresponding page has been read, as currently reflected in processed readership information. The number of times may be tracked and incremented each time readership information indicates the section has been read.

In various embodiments, the readership information is stored in association with the publisher of the published document. Furthermore, readership information from a consumer device may optionally be stored in association with a consumer account that corresponds to the consumer that read the published document on the consumer device. In these embodiments, the readership information may be provided to a consumer device in association with the consumer account so that the consumer can later be presented with readership information specific to the consumer. The manner of presentation can be similar to or different than that shown in FIGS. 2A, 2B, and 3 with respect to display for a publisher. In doing so, the consumer can distinguish between, for example, which sections of the published document they have read, and which sections they have not yet read.

At block 430, method 400 includes sending at least some of the stored readership information to a publisher device. For example, cloud infrastructure 106 can provide the XML file to publisher device 104a for presentation with published document 130 in publisher tool 110 which can comprise a document reader. By providing the XML file to publisher device 104a, publisher tool 110 (or more generally a presentation component) can process the readership information therein, for presentation with corresponding pages of published document 130. The readership information sent to publisher device 104a can indicate a number of times one or more sections of the published document have been read on the consumer devices. For example, one or more section identifiers and/or read counts may be included in the readership information. The processing of the readership information can include categorizing the pages and/or determining one or more indicators to present in association with the pages, such as those described with respect to FIGS. 2A, 2B, and 3. It is noted that in some cases, the processing may be performed, at least partially on cloud infrastructure 106 and/or a consumer device (e.g., prior to sending the readership information to cloud infrastructure 106 and/or where the readership information is being displayed to a user on the consumer device).

In some cases, the stored plurality of readership information indicates that a first section of a published document has been read on consumer devices more times than a second section of the published document. Optionally, in processing the readership information, it may be determined that a section is read based on the number of consumer device from which readership information for the section indicates the section has been read. For example, where the number of consumer devices exceeds a threshold value, the section may be determined as having been read on the aggregate, otherwise it may be determined that the section has not been sufficiently read and the section may be designated as unread on the aggregate.

Referring to FIG. 5, a flow diagram showing method 500 is shown. At block 510, method 500 includes receiving eye-tracking data associated with a published document displayed on a consumer device. For example, readership analysis component 126 can receive eye-tracking data from eye-tracking component 124. The eye-tracking data comprises measurements of eye movements of consumer 128 captured in association with published document 130 while displayed on consumer device 102*a*. For example, the eye-movements may be captured while consumer 128 is reading published document 130 in document reader 108.

At block 520, method 500 includes determining one or more sections of the published document read on a consumer device based on the received eye-tracking data. For example, readership analysis component 126 can determine which pages of published document 130 have been read by consumer 128 based on the eye-tracking data. In doing so, readership analysis component 126 may also determine that one or more pages have not been read or sufficiently read by the consumer. In one example, readership analysis component 126 determines the time spent by the user on page 130*a* based on the eye-tracking data. Readership analysis component 126 further calculates a baseline reading time for a baseline consumer and determines that page 130*a* may have been sufficiently read based on the time spent being greater than or equal to 90 percent of the baseline reading time (or more generally based on a comparison between the time spent and the baseline reading time). Further, readership analysis component 126 determines scan area 136 of consumer 128 from the eye-tracking data. Readership analysis component 126 further determines bounding box 132 based on text 134 and determines that page 130*a* may have been sufficiently read based on scan area 136 being greater than or equal to 90 percent of the area of bounding box 132 (or more generally based on a comparison between the scan area and an area corresponding to the content of the page/section). Based on both of the foregoing conditions being met, readership analysis component 126 determines that page 130*a* has been read by consumer 128. Readership analysis component 126 can make similar determinations for each page and/or section of published document 130.

At block 530, method 500 includes generating readership information corresponding to the one or more sections. For example, readership analysis component 126 can generate readership information that identifies the pages determined as being read by consumer 128. For example, the readership information can comprise page number and/or ranges that identify the pages. The readership information can also include other information associated with each of the identified pages, ranges, and/or reader sessions corresponding to the pages that were determined as being read.

At block 530, method 500 includes sending the readership information in association with the published document. For example, the generated readership information can be sent by consumer device 102*a* to cloud infrastructure 106 over network 116. The readership information may be associated with published document 130 by consumer device 102*a* sending a document identifier, such as document ID 140 of published document 130, to cloud infrastructure 106. The sending may be by transmission component 144 corresponding to executed code embedded in published document 130. Further, the readership information can be sent to server location 142 extracted from published document 130.

Figure 6:
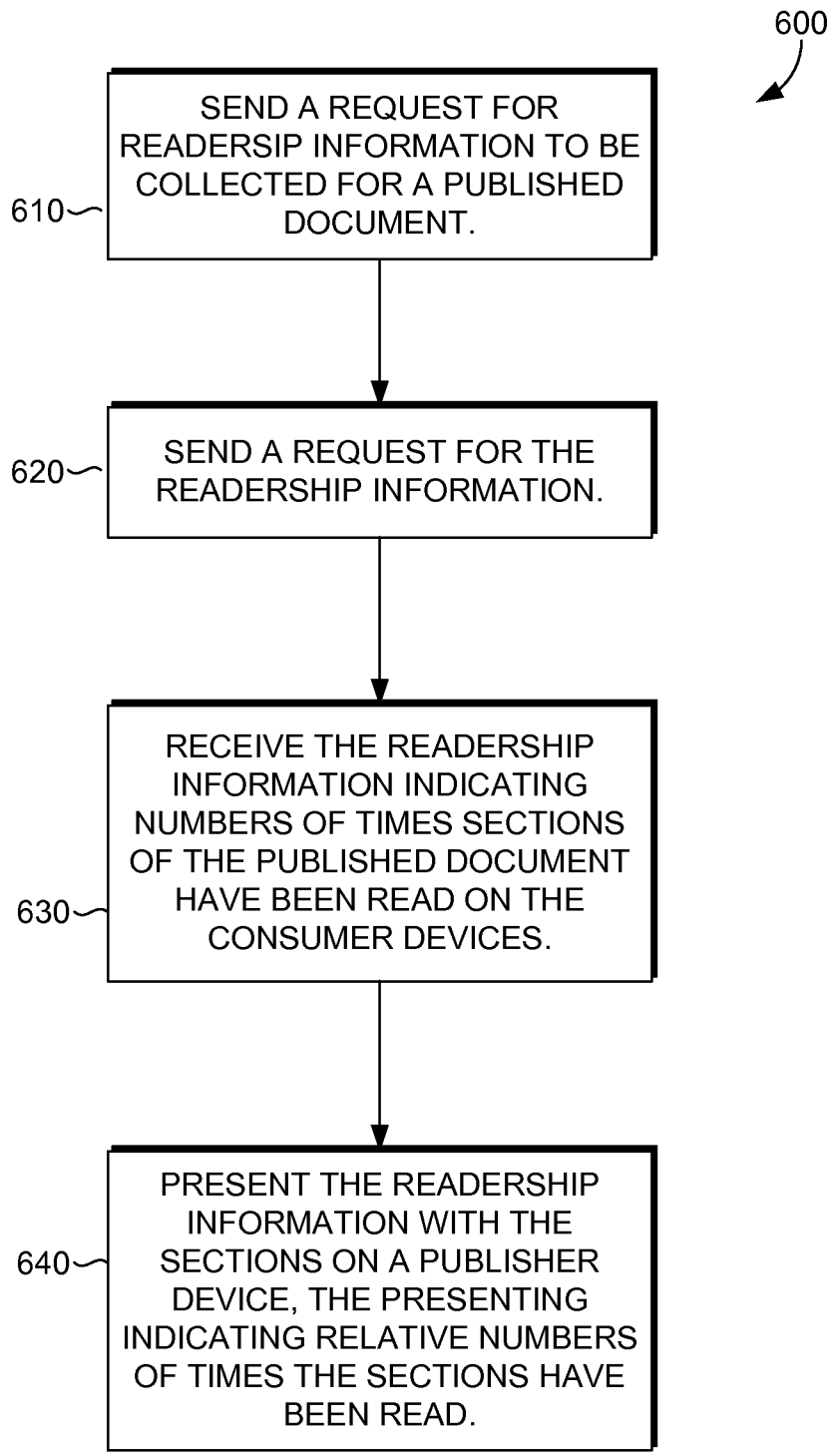
FIG. 6 is a flow diagram showing an exemplary method for providing readership information of published documents to publishers.

Referring to FIG. 6, a flow diagram showing method 600 is shown. At block 610, method 600 includes optionally sending configuration instructions for readership information to be collected for a published document. For example, publisher device 104*a* can send configuration instructions to cloud infrastructure 106 over network 116 that readership information be collected for published document 130. In some cases, the configuration instructions include published document 130 being sent to cloud infrastructure 106. Published document 130 can be sent with document ID 140, server location 142, and/or transmission component 144 embedded therein. The information may be embedded by publisher tool 110 (e.g., a document reader) prior to publisher tool 110 sending published document 130 to cloud infrastructure 106, or any of the information may be embedded on cloud infrastructure 106.

A publisher can provide published document 130 for distribution to a plurality of consumer devices. For example, the publisher may provide published document 130 to an e-mail service or online distributor for distributing copies of published document 130. Based on the configuration instructions from publisher device 104*a*, the readership information from the consumer devices are collected in cloud infrastructure 106. In other embodiments, the readership information could be stored and collected without the configuration instructions.

At block 620, method 600 includes optionally sending a request for the readership information. For example, publisher device 104*a* can send a request to cloud infrastructure 106 for the readership information of published document 130. The request may include document ID 140, extracted by publisher tool 110, which may be used to send the request. Furthermore, the request may be sent by publisher tool 110 and may be sent based on publisher tool 110 detecting at least some of the embedded information in published document 130. In some embodiments, published document 130 is downloaded and/or opened from cloud infrastructure 106. In these embodiments, the request may be implicit in a request to download and/or open published document 130.

At block 630, method 600 includes receiving the readership information indicating the number of times sections of the published document have been read on the consumer devices. For example, an XML file can be sent from cloud infrastructure 106 to publisher device 104*a* (publisher tool 110) that corresponds to published document 130. The XML file can include section identifiers and read counts corresponding to those section identifiers, as one example. A read count for a section may be determined by counting each time readership information from a consumer device indicates that the section has been read. Therefore, the read count can be an aggregate measurement of the readership information amongst consumer devices. Each section identifier may correspond to a section of published document 130 and each section identifier may have a corresponding read count included in the XML file or otherwise derivable therefrom. In embodiments where published document 130 is downloaded and/or opened from cloud infrastructure 106, the XML file may be sent with published document 130.

At block 640, method 600 includes presenting the readership information with the sections on a publisher device, the presenting indicating relative numbers of times the sections have been read. For example, publisher tool 110 can parse the XML file and analyze the readership information therein. Publisher tool 110 can categorize the sections based on the read counts to present the sections in context with indications of read counts relative to read counts of other sections. Such a presentation can be on the display of publisher device 104*a* can could correspond to screens 260, 262, and/or 376. Thus, the publisher can view the readership information in context with published document 130.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to providing readership information of published documents to publishers based on eye-tracking. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for indicating readership of published documents to publishers:

transmitting a published document to consumer devices, wherein the published document is enabled to retrieve readership information associated with the published document, wherein the readership information indicates sections of the published document have been read, wherein the readership information indicates whether the sections have been read based on eye-tracking data;

receiving, from consumer devices, readership information for the published document, the published document accessed at each of the consumer devices;

accessing, in readership information from the consumer devices, read-section identifiers for sections that have been read, wherein a read-section identifier operates as an indicator that the sections have been read, wherein other sections of the published document have not been read;

determining, using the read-section identifiers in the readership information from the consumer devices, count readership information comprising a number of times the sections have been read across the consumer devices;

accessing configuration instructions from a publisher of the published document, wherein the configuration instructions indicate how to provide the readership information;

based on the configuration instructions and the readership information, generating publisher readership information comprising the count readership information and corresponding consumer devices associated with the readership information, wherein the publisher readership information comprises information indicating differences in readership information between the first section in a first consumer device and the first section in a second consumer device; and sending the publisher readership information to a publisher device.

2. The method of claim 1, wherein the readership information is stored in association with the published document based on a document identifier of the published document received from the consumer devices in association with corresponding portions of the readership information.

3. The method of claim 1, wherein the sending the readership information to the publisher device is in response to receiving a request from a document reader on the publisher device.

4. The method of claim 1, wherein the readership information indicates that uniquely identifiable sections read on the first consumer device of the consumer devices are different than uniquely identifiable sections read on the second consumer device of the consumer devices based on read-section identifiers from the first consumer device being different than read-section identifiers from the second consumer device.

5. The method of claim 1, wherein each uniquely identifiable section corresponds to a section identifier of section identifiers that uniquely identify the following: an article, a chapter, a paragraph, or a page across each of the consumer devices.

6. The method of claim 1, comprising receiving a request from a publisher associated with the publisher device to store the readership information in association with the published document prior to the receiving the readership information from the consumer devices, wherein storing the readership information in association with the published document being based on the receiving of the request.

7. The method of claim 1, comprising:
receiving the published document from the publisher device; and generating a storage structure for the readership information from the published document, the storing of the readership information in association with the published document being in the generated storage structure.

8. The method of claim 1, wherein the readership information sent to the publisher device identifies that a first section of the published document has been read on the consumer devices more times than a second section of the published document.

9. One or more computer-storage media storing computer-useable instructions that, when executed by a computing device, perform a method for indicating readership of published documents to publishers, the method comprising:

based on a selection of a tracking option by a publisher associated with a published document, enabling readership information to be tracked for the published document;

based on enabling the readership information to be tracked, receiving, from consumer devices, readership information for the published document, the published document accessed at each of the consumer devices;

accessing, in readership information from the consumer devices, read-section identifiers for sections that have been read, wherein a read-section identifier operates as an indicator that the sections have been read, wherein other sections of the published document have not been read;

determining, using the read-section identifiers in readership information, count readership information comprising a number of times the sections have been read across the consumer devices based on the readership information, generating publisher readership information comprising the count readership information and corresponding consumer devices associated with the readership information, wherein the publisher readership information comprises information indicating differences in readership information between the first section in a first consumer device and the first section in a second consumer device;

wherein the sections of the published document are grouped into categories based on the determined number of times each section has been read across the consumer devices, the categories representing different ranges of read counts between sections; and causing display of at least a portion of the published document and the categories to the publisher in a document reader, each category of the categories being displayed with at least one link, each link being selectable by the publisher to display at least one of the sections of the category to the publisher in the document reader.

10. The one or more computer-storage media of claim 9, wherein each category of the categories represents a different range of numbers of times in the category has been read.

11. The one or more computer-storage media of claim 9, wherein the at least the portion of the published document is displayed in a main window of the document reader and the categories are displayed in a pane of the document reader.

12. A computer-implemented method for indicating readership of published documents to publishers:

receiving tracking data captured in association with a published document displayed on a consumer device, wherein the published document is enabled to retrieve readership information of the published document, wherein the published document comprises a first section and a second section;

based on the tracking data, determining that sections of the published document have been read;

based on determining that the sections have been read, generating read-section identifiers for the readership information, wherein a read-section identifier operates as an indicator a corresponding section has been read; and sending the readership information to cause generation of publisher readership information comprising count readership information and corresponding consumer devices associated with the readership information, wherein the publisher readership information comprises information indicating differences in readership information between the first section in a first consumer device and the first section in a second consumer device.

13. The method of claim 12, wherein each uniquely identifiable section corresponds to a section identifier of section identifiers that uniquely identify the following: an article, a chapter, a paragraph, or a page of the published document.

14. The method of claim 12, wherein the readership information is sent in association with the published document, wherein the sending the readership information in association with the published document comprises:
retrieving a document identifier embedded within the published document on the consumer device; and
sending the retrieved document identifier in association with the readership information over the one or more network communications.

15. The method of claim 12, wherein the sending the readership information is performed by a transmission component instantiated by executed code embedded in the published document.

16. The method of claim 12, further comprising displaying, by a document reader, the published document on the consumer device, wherein the tracking data is eye-tracking data from an eye-tracking component, the eye-tracking data comprising—measurements of eye movements captured in association with the published document displayed on a consumer device,
wherein determining whether the sections have been read is based on a percentage of a total area of the sections that were read on the consumer device, the percentage of a total area is determined based on comparing a scan area represented by the eye-tracking data to the total area, the determining the percentage of the sections of the published document read on the consumer device being performed by the document reader.

17. The method of claim 16, wherein the determining for a section, the percentage of the section of the published document read on the consumer device comprises:
determining, from the eye-tracking data, a time spent by a consumer scanning the section on the consumer device;
determining, a baseline reading time for the section; and
comparing the time spent by the consumer scanning the to the baseline reading time for the section.

18. The method of claim 16, wherein the total area is represented by a bounding box, and wherein the determining the percentage of the total area of the section of the published document read on the consumer device comprises:
determining, from the eye-tracking data, a scan area rectangle representing the scan area, where the scan area represents an amount of content of the sections scanned by a consumer using the consumer device;
determining, from the published document, the bounding box representing a total amount of the content in the sections; and
comparing the scan area rectangle to the bounding box.

19. The method of claim 16, wherein the determining the percentage of the total area of the sections of the published document read on the consumer device comprises:
determining, from the eye-tracking data, the scan area representing at least a portion of the sections scanned by the consumer using the consumer device;
determining, from the published document, a total area representing the sections; and
comparing the determined scan area to the determined total area.

20. The method of claim 12, wherein the sent readership information comprises one or more page numbers of the published document that indicates the sections as being read on the consumer device.

* * * * *

UNITED STATES PATENT AND TRADEMARK OFFICE
CERTIFICATE OF CORRECTION

PATENT NO. : 10,853,823 B1  
APPLICATION NO. : 14/751021  
DATED : December 1, 2020  
INVENTOR(S) : Shilpi Aggarwal et al.

It is certified that error appears in the above-identified patent and that said Letters Patent is hereby corrected as shown below:

In the Drawings

In sheet 7 of 8, FIG. 6, reference numeral 610, Line 2, delete "READERSIP" and insert -- READERSHIP --, therefor.

In the Claims

In Column 23, Line 6, Claim 12, after "indicator" insert -- that --.

In Column 24, Line 14, Claim 17, delete "the" and insert -- the section --, therefor.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*